US011703311B1

(12) United States Patent
Kocic

(10) Patent No.: US 11,703,311 B1
(45) Date of Patent: Jul. 18, 2023

(54) FIXTURE-ASSEMBLING SYSTEM

(71) Applicant: Hexagon Metrology, Inc., North Kingstown, RI (US)

(72) Inventor: Milan Kocic, Pawtucket, RI (US)

(73) Assignee: Hexagon Metrology, Inc., North Kingstown, RI (US)

(*) Notice: Subject to any disclaimer, the term of this patent is extended or adjusted under 35 U.S.C. 154(b) by 0 days.

(21) Appl. No.: 17/586,507

(22) Filed: Jan. 27, 2022

(51) Int. Cl.
*G01B 5/008* (2006.01)
*G01B 5/00* (2006.01)

(52) U.S. Cl.
CPC .......... *G01B 5/0004* (2013.01); *G01B 5/008* (2013.01)

(58) Field of Classification Search
CPC ... G01B 5/0004; G01B 5/0007; G01B 5/0009
USPC .......................................................... 33/502
See application file for complete search history.

(56) References Cited

U.S. PATENT DOCUMENTS

| 5,026,033 | A | * | 6/1991 | Roxy | ...................... | B23Q 3/103 |
| | | | | | | 269/45 |
| 5,107,599 | A | * | 4/1992 | Marincic | ............... | G01B 5/0004 |
| | | | | | | 269/45 |
| 5,481,811 | A | * | 1/1996 | Smith | .................... | B25B 31/005 |
| | | | | | | 33/573 |
| 8,453,337 | B2 | * | 6/2013 | Lacy | ..................... | G01B 5/0004 |
| | | | | | | 33/503 |
| 9,879,966 | B2 | * | 1/2018 | Xue | ....................... | G01B 5/0025 |
| 10,697,756 | B2 | * | 6/2020 | Sarno | .................... | G01B 5/0007 |
| 2018/0265148 | A1 | * | 9/2018 | Stanggren | .............. | B23K 26/38 |
| 2018/0274911 | A1 | * | 9/2018 | Filipovich | .............. | F16M 11/22 |
| 2019/0111533 | A1 | * | 4/2019 | Bisson | ................. | F16M 11/041 |
| 2020/0096316 | A1 | * | 3/2020 | Vinshtok | ............ | G01B 11/2545 |
| 2022/0082365 | A1 | * | 3/2022 | Verduin | ............... | G01B 5/0004 |

OTHER PUBLICATIONS

International Search Report and Written Opinion for International Application No. PCT/US2023/010190, dated May 8, 2023, 14 pages.

* cited by examiner

*Primary Examiner* — George B Bennett
(74) *Attorney, Agent, or Firm* — Nutter McClennen & Fish LLP

(57) ABSTRACT

A system for assembling a fixture to hold a workpiece for measurement by a CMM includes a plurality of fixture components. The fixture components are used to assemble the fixture. The system also includes a fixture plate having a plurality of fixture component securing portions that are configured to couple with the fixture components to define the fixture. The fixture is configured to couple with the workpiece to hold the workpiece in a predefined orientation. A fixture identifier is configured to identify the fixture components, and a securing portion identifier is configured to identify the securing portions that couple with the fixture components. A visual emphasizing unit is configured to visually emphasize one or more of the fixture components and/or one or more of the securing portions to provide an indication of a fixture component that is to be coupled with a corresponding securing portion.

26 Claims, 14 Drawing Sheets

FIXTURE-ASSEMBLING SYSTEM

FIELD OF THE INVENTION

Illustrative embodiments of the invention generally relate to measuring manufactured objects using a coordinate measuring machine and, more particularly, the various embodiments of the invention relate to assembling a fixture for holding the object.

BACKGROUND OF THE INVENTION

Coordinate measuring machines ("CMMs") are used to perform fine measurements of manufacturing objects to confirm compliance with manufacturing standards. For example, jet engine manufacturers may wish to measure the dimensions of particular features of the engine. To that end, the object may be placed on a fixture that assists with holding the object in some pre-determined orientation.

SUMMARY OF VARIOUS EMBODIMENTS

In accordance with one embodiment of the invention, a system for assembling a fixture to hold a workpiece for measurement by a CMM includes a plurality of fixture components. The fixture components are used to assemble the fixture. The system also includes a fixture plate having a plurality of fixture component securing portions that are configured to couple with the fixture components to define the fixture. The fixture is configured to couple with the workpiece to hold the workpiece in a predefined orientation. A fixture identifier is configured to identify the fixture components, and a securing portion identifier is configured to identify the securing portions that couple with the fixture components. A visual emphasizing unit is configured to visually emphasize one or more of the fixture components and/or one or more of the securing portions to provide an indication of a fixture component that is to be coupled with a corresponding securing portion.

The system may also include a workpiece to be measured. Furthermore, the system may include a CMM configured to have the fixture plate within its measuring space. In some embodiments, the visual emphasizing unit includes a light source. Alternatively, or additional, the visually emphasizing unit is configured to visually emphasize the fixture component and/or the securing portion in a display of an augmented reality visualization system Among other things, the fixture identifier may include a camera. In some embodiments, the system includes a workpiece identifier configured to identify the workpiece, and to provide instructions regarding coupling fixture components with securing portions.

In accordance with another embodiment, a method assembles a fixture to hold a workpiece for measurement by a CMM. The method provides a plurality of fixture components that are used to assemble a fixture for holding a workpiece to be measured. The method also provides a fixture plate that has a plurality of fixture component securing portions. The fixture component securing portions are configured to couple with the fixture components to hold the fixture components in a predefined position. The method receives information relating to the workpiece to be measured and/or the fixture to be assembled. The method determines the fixture components that are used to assemble the fixture as a function of receiving the information. Additionally, the method determines the securing portions that correspond to each of the fixture components that are used to assemble the fixture. The method identifies a first fixture component from the fixture components that are used to assemble the fixture, and visually emphasizes the first fixture component. The method also identifies a first securing portion that corresponds to the first fixture component, and visually emphasizes the first securing portion.

The method may couple the first fixture component with the first securing portion to hold the first fixture component in a predefined position relative to the fixture plate. The method may assemble the fixture components until the fixture is fully assembled. The method may also couple the workpiece to the assembled fixture for measurement.

In illustrative embodiments, the method identifies each fixture component associated with the fixture, visually emphasizes each fixture component associated with the fixture, and/or visually emphasizes each corresponding securing portion associated with the fixture. Furthermore, a plurality of fixture components may be visually emphasized simultaneously.

In some embodiments, the method identifies and visually emphasizes a second fixture component. The method also identifies and visually emphasizes a second securing portion that corresponds to the second fixture component. Visually emphasizing the second fixture component and/or the second securing portion may include displaying a light on the second fixture component and/or the second securing portion.

As mentioned previously, among other ways, visually emphasizing the first fixture component and/or the first securing portion includes displaying a light on the first fixture component and/or the first securing portion. The light may have a first color and/or form a first pattern. The light pattern may form a number shape and/or a speckle pattern. Additionally, the light may have a second color and/or form a second pattern for visually emphasizing the second component and/or the second securing portion.

Alternatively, the method may visually emphasize the first fixture component in an augmented reality visualization system. The augmented reality visualization system may include the display screen of a computer device, such as a smartphone. In illustrative embodiments, the augmented reality visualization system may include eye-glasses.

The fixture components may include dowels having a threaded end and/or a magnetic end. The securing portions may include corresponding threaded holes and and/or magnetic holes.

Some embodiments may visually emphasize a single fixture component at a time. Some other embodiments may visually emphasizes a plurality of fixture components at simultaneously. Visually emphasizing the fixture components may include controlling a light source to display a light on the at least one fixture component. Furthermore, a second fixture component may be visually emphasized after a first fixture component is coupled with a first securing portion.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, components of a fixture configured to hold a given workpiece are visually emphasized, thereby allowing easy identification of a given component by a technician. Securing portions in a fixture plate that correspond to the components are also visually emphasized. The process may further visually emphasize an order of assembly for the components, as well as a position and orientation of each component. Accordingly, the task of fixture assembly is substantially simplified and errors are reduced. Details of illustrative embodiments are discussed below.

Figure 1:
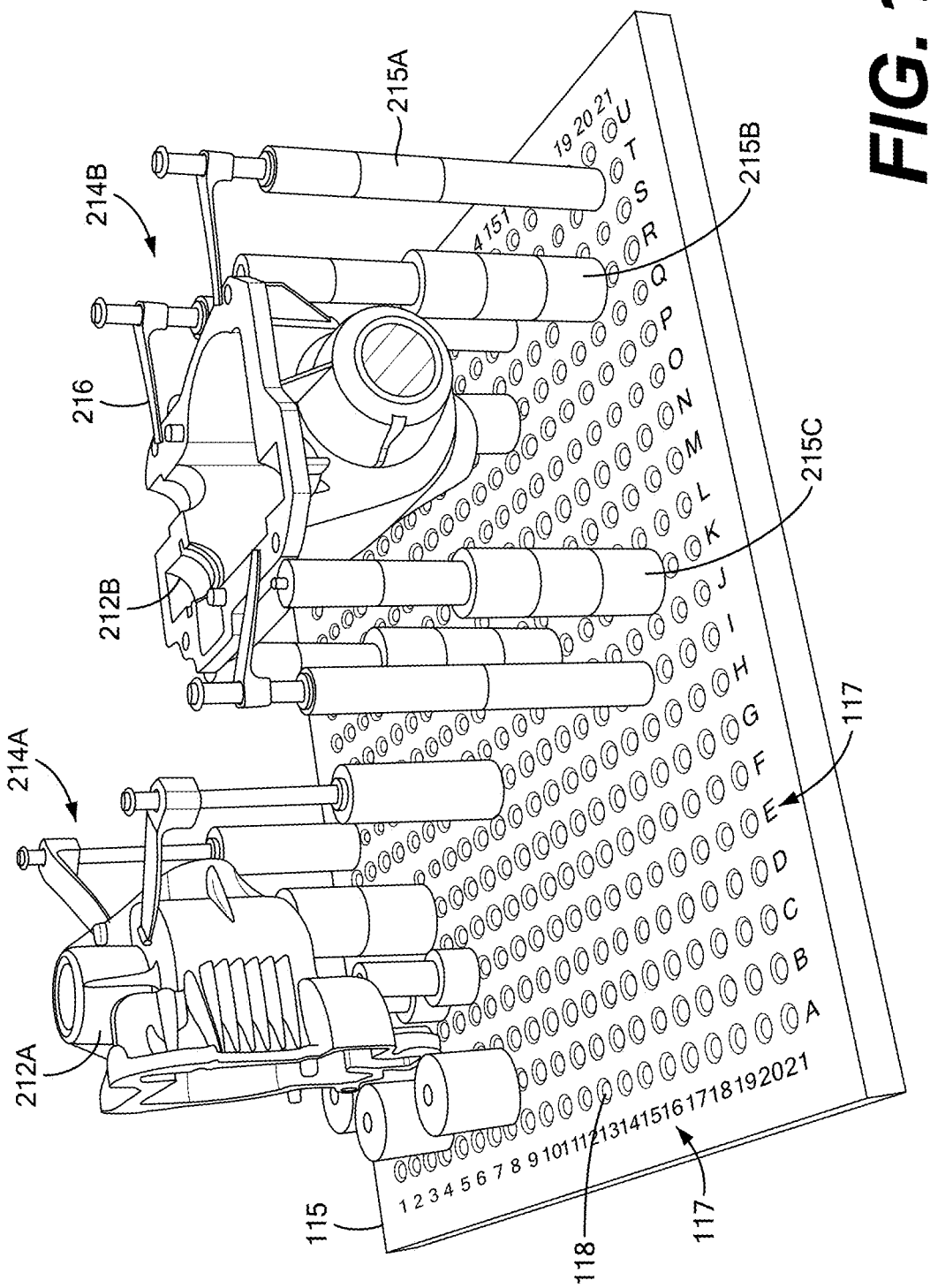
FIG. 1 shows two workpieces each secured to a fixture in accordance with illustrative embodiments of the invention.

FIG. 1 shows two workpieces 212A and 212B (also referred to generally as workpieces 212 or objects 212) secured to one of two fixtures 214A and 214B, respectively, in accordance with illustrative embodiments of the invention. As known by those skilled in the art, fixtures 214 are used to hold workpieces 212 in a fixed position on a fixture plate 115. As the workpiece 212 is held in a known orientation, the workpiece 212 is measured using a CMM (e.g., having a part measurement program for the particular workpiece 212).

Illustrative embodiments improve the process of correctly assembling the fixture by reducing the likelihood of assembly error, and also by reducing overall assembly time. In general, a technician is tasked with searching for the workpiece 212 serial number (or other identification) and determining the fixture 214 associated with the workpiece 212. Thereafter, written instructions are provided to the technician listing detailed steps of how each fixture component 215 is assembled on the plate 115. With some components 215 (e.g., 215A), details regarding the precise position, orientation, and order of assembly may be provided.

Among other things, fixture components 215 may include tension clamps, toggle clamps, tension springs, and magnetic clamping springs, among other things. A particular workpiece 212 may need to be clamped at a particular location, and in a particular order (e.g., to reduce the likelihood of warping the part 212). Thus, it is desirable to correctly assemble the fixture 214 on the fixture plate 115. To that end, illustrative embodiments provide the fixture plate 115 having alpha-numeric markings 117 thereon (e.g., located along the perimeter of the plate 115. The markings 117 provide a coordinate system for fixture securing portions 118 (e.g., threaded holes 118). The fixture plate 115 may include a plurality of threaded holes 118 evenly spaced throughout a top surface thereof. The markings 117 assist an operator with identifying and documenting appropriate hole 118 to ensure quick and accurate setup. However, in some embodiments, the fixture plate 115 may lack markings 117.

Even with the markings 117, the inventors determined that accurately positioning the appropriate fixture components 215 in the appropriate securing portions 118 is a time-consuming task that is error prone. This difficulty can be further complicated if the components have a particular orientation. The inventors believe a reason for this difficulty is because instructions for positioning the fixture components 215 are generally written instructions, and fixtures 214 can be rather complex. Furthermore, different workpiece 212 may have a different set of components 215 that are assembled in a different position, order, and orientation. As mentioned previously, some fixtures 214 also include clamps 216, which are clamped in a particular order (e.g., to prevent potentially deforming the part). Furthermore, some parts (e.g., larger parts) may join multiple fixture plates 115 together, further adding to the complexity of accurately and quickly assembling the fixture 214.

Figure 2:
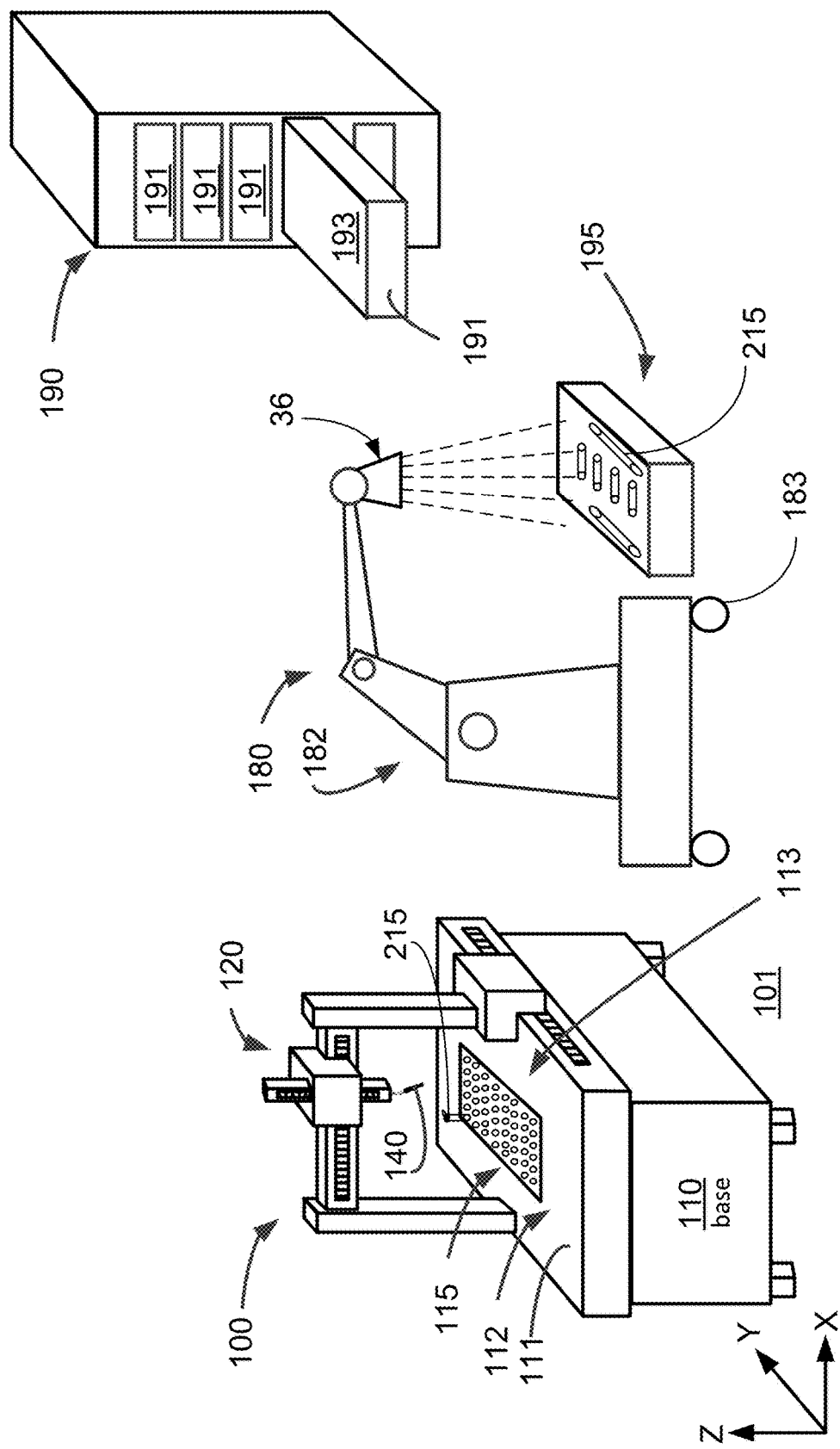
FIG. 2 schematically illustrates a system for assembling a fixture in accordance with illustrative embodiments.

FIG. 2 schematically illustrates a system for assembling the fixture 214 in accordance with illustrative embodiments. As shown, the system may include the coordinate measuring machine 100, an assembly assistant 180, and component storage 190. As known by those in the art, the coordinate measuring machine 100 (or "CMM") is configured to measure one or more features of the workpiece 212. CMMs are represented in FIG. 2 by the coordinate measuring machine 100.

In the illustrative embodiment of FIG. 2, the CMM 100 includes a base 110 having a table 111. The table 111 of the CMM 100 defines an X-Y plane 112 that typically is parallel to the plane of the floor 101, a Z-axis normal to the X-Y plane, and a corresponding X-Z plane and Y-Z plane. The table 111 also defines a measuring space 113 above the table 111. In general, the components 215 are assembled into the fixture 214 in the measuring space 113. However, in some embodiments, the components 215 may be assembled outside of the measuring space 113, and then moved the measuring space 113.

The CMM 100 has movable features (collectively, 120) arranged to move and orient a measuring sensor 140 (and in some embodiments, a plurality of such devices) relative to the workpiece. The features 120 of the CMM 100 are configured to move and orient the measuring sensor 140, relative to the workpiece, in one dimension (X-axis; Y-axis; or Z-axis), two dimensions (X-Y plane; X-Z plane; or Y-Z plane), or three dimensions (a volume defined by the X-axis, Y-axis, and Z-axis).

One or more fixture components 215 are stored in the component storage 190 and/or in a fixture kit 195. In illustrative embodiments, the storage system 190 includes one or more kits 195 containing fixture components 215 in an organized arrangement. Additionally, or alternatively, the storage 190 may include drawers 191 (or shelves 191) having fixture components 215 scattered therein.

Assembly assistant 180 may include a component emphasizer 200 configured to identify a given component 215 and to visually emphasize the component 215. The emphasizer 200 may include a light source for visually emphasizing the component 215. Additionally, or alternatively, the emphasizer 200 may include a display and machine vision (e.g., a camera), and/or a touch probe configured to identify components 215 of the fixture 214. For the sake of convenience, discussions of embodiments below may refer to emphasizing the component 215 using the light source 200. However, it should be understood that illustrative embodiments may operate with any of the above-described component emphasizers 200 and/or other component emphasizers 200 not described herein.

In illustrative embodiments, the assistant 180 is disposed so that it can reach the component storage 190 (e.g., kit 195 and/or shelf 191), as well as the table 111 of the coordinate measuring machine 100, so that the assistant 180 may view the components in storage 190 as well as a fixture plate 115 on the table 111. To that end, the assistant 180 in some embodiments has the identifier 200 attached to a movable articulated arm 182. Additionally, the assistant 180 may be mounted on wheels 183 for ease of movement. Although the assistant 180 is shown as a larger device having parts such as the articulated arm 182 and wheels 183, in some embodiments the assistant 180 may come in a considerably smaller form factor. For example, some embodiments may include the assistant 180 on a smartphone (e.g., as a smartphone application) and/or as a heads-up display in augmented-reality glasses. In such embodiments, the assistant 180 may not include the articulated arm 182 and/or other parts shown in the figure. In illustrative embodiments, the component emphasizer 200 views the components 215 of the fixture in the storage 190, and identifies the various components 215.

Figure 3:
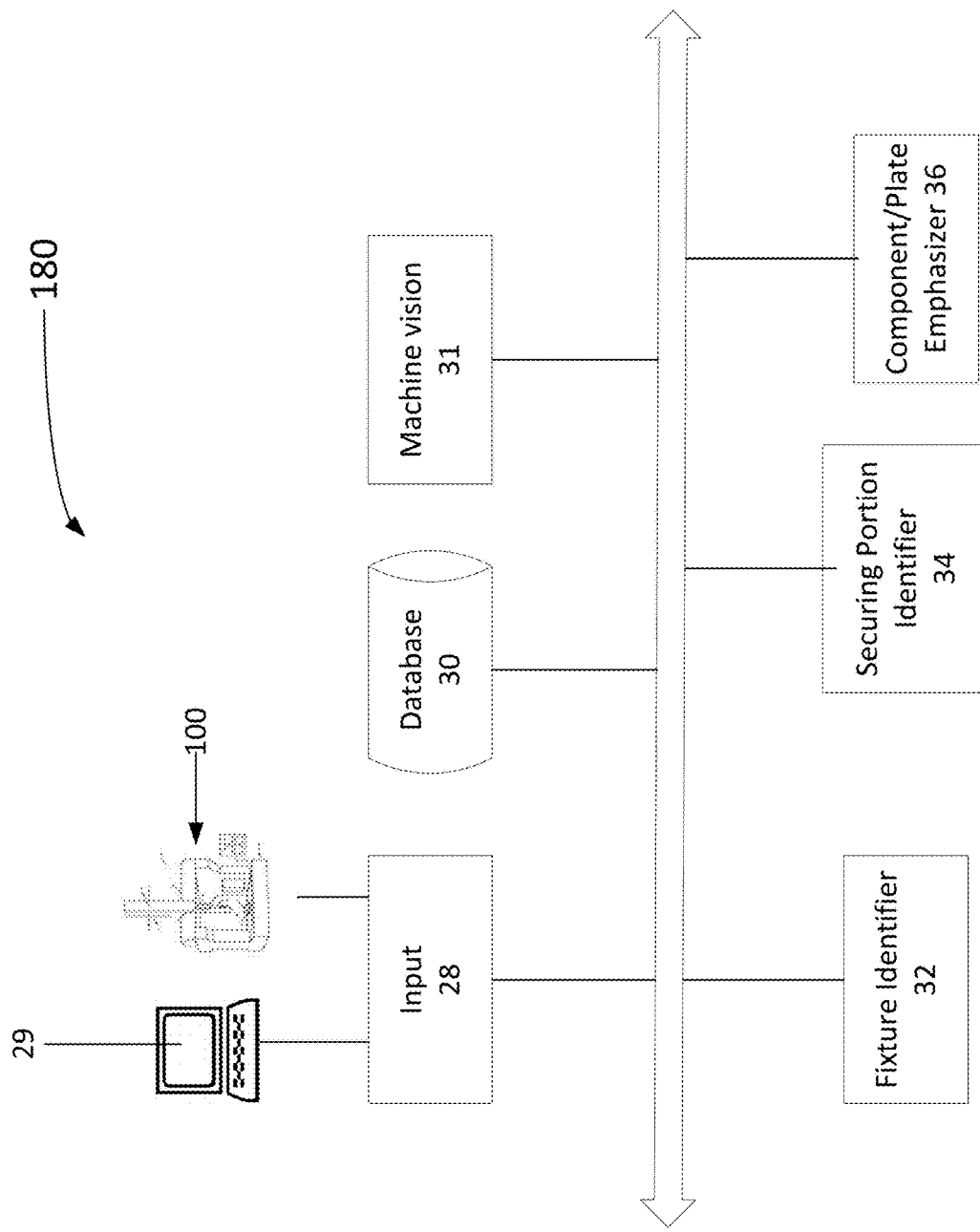
FIG. 3 schematically shows details of the assembly assistant in accordance with illustrative embodiments of the invention. Each of these components is operatively connected by any conventional interconnect mechanism.

FIG. 3 schematically shows details of the assembly assistant 180 in accordance with illustrative embodiments of the invention. Each of these components is operatively connected by any conventional interconnect mechanism. FIG. 3 simply shows a bus communicating the components. Those skilled in the art should understand that this generalized representation can be modified to include other conventional direct or indirect connections. Accordingly, discussion of the bus is not intended to limit various embodiments.

The assembly assistant 180 includes an input 28 configured to receive a three-dimensional model of one or more fixtures 214 to be assembled (e.g., from a user on a computer and/or the CMM 100). For example, the model of the fixture 214 may be a CAD model. In some embodiments, the model includes the object 212 that the fixture 214 holds. However, in some other embodiments, the model may not include the object 212. Additionally, or alternatively, the model may include the associated fixture plate 115.

Generally, the object 212 being measured is manufactured (e.g., injection molded) on the basis of some underlying three-dimensional model with nominal object 212 specifications—i.e., the object 212 model. The object 212 model generally includes the ideal specifications of the object 212, including measurements for various dimensions. In various embodiments, the object 212 is measured by the CMM 100 to compare the physical dimensions of the object 212 with the nominal dimensions in the model.

The model of the fixture 214 may include various fixture specifications, such as details about each of the components 215 of the fixture, the positions of the components 215 relative to the fixture plate 115, and/or the orientation of the components 215.

The input 28 may also communicate with a computer 29 (e.g., a mobile device) via a user-interface. The input 28 may receive details from the computer 29 regarding the object 212, and/or the fixture 214.

The measuring system 26 also includes a database 30, where the various received models for different types of fixtures 214 may be stored. Additionally, the database 30 may include information about the fixture 214, such as where each component 215 is located in the kit 195, where each component 215 should be positioned and oriented on the plate 115, etc. The database 30 may also include details of each individual component 215

The database 30 may also include information relating to the CMM 100. For example, the database 30 may include information about the make and model of the CMM 100, in addition to information regarding the movable components 16. As an additional example, the database 30 may have information relating to the size and dimensions of the various movable components 120 (e.g., make and model of probe and wrist with associated dimensions). Furthermore, the database 30 may include information (e.g., a CAD model) relating to the object 212 that corresponds to each particular fixture 214. Alternatively, the above described information may be received through the input 28. The input 28 also receives information relating to fixture 214 specifications (which may be user-inputted or included as part of the model).

A fixture identifier 32 communicates with the database 30, the input 28, and/or machine vision 31 to determine what object 212 is to be measured and/or what fixture 214 is to be used. In some embodiments, the fixture identifier 32 may combined with the component identifier 200. The fixture identifier 32 may be pre-programmed to analyze certain features of the workpiece 212 or the components 215 to make the determination as to what fixture is being assembled based on the identification of a particular feature. For example, for a particular pentagon shaped workpiece 212, the identifier 32 may detect the five edges and vertexes, and automatically determine that the workpiece 212 is a particular pentagon. The fixture identifier 32 may then communicate with the database 30 to identify the corresponding fixture 214.

Alternatively, the fixture identifier 32 may analyze a fixture kit 195 (e.g., using machine vision) and determine the fixture components 215 that correspond to a particular fixture 214. The fixture identifier 32 may determine the identity of the components 215 and communicate with the database 30 to find the corresponding fixture 214 assembly plans. Accordingly, the fixture identifier 32 may also be referred to as a component identifier 32.

In yet another embodiment, the fixture identifier 32 may receive an input from a user (e.g., a selection via iPhone application) regarding the workpiece 212 and/or the fixture 214, and may retrieve the fixture 214 assembly plans. As should be apparent from the above discussion, the fixture identifier 32 may also be configured to identify particular components 215 of the fixture 214.

The assistant 180 may also include a securing portion identifier 34. The securing portion identifier 34 is configured to identify securing portions 118 that correspond to the various components 215 of the given fixture 214 identified by the fixture identifier 32. The securing portion identifier 34 may have logic that determines the precise location of the securing portion 118 (e.g., based on a column and row assigned to each securing portion 118). This is similar to a computer identify squares on a chess board (e.g., square A3, etc.).

The fixture identifier 32 and the securing portion identifier 34 communicate with the emphasizer 200. The emphasizer 200 receives information regarding assembly plans for the given fixture 214. These assembly plans include details of the fixture 214, the components 215, and the fixture plate 115. The assembly plans provide instructions regarding the position and orientation of each component 215 on the fixture plate 115. The assembly plans may also include information relating to the order in which the various components 215 are to be assembled.

After the assembly plan are received by the emphasizer, the emphasizer 200 receives information from machine vision 31, the fixture identifier 32, and/or the securing portion identifier 34 regarding the location of the various components 215 of the fixture 214. To that end, the emphasizer 200 may communicate with machine vision 31 (e.g., a camera-equipped smartphone or other dedicated device). The emphasizer 200 visually emphasizes the first component 215 of the fixture 214 to be assembled. Then, the emphasizer emphasizes the attachment location of the first component 215 on the plate 115 (e.g., the securing portion 118). This process is repeated for each component 215 of the fixture 214 until the assembly is complete.

It should be noted that FIG. 3 only schematically shows each of these components. Those skilled in the art should understand that each of these components can be implemented in a variety of conventional manners, such as by using hardware, software, or a combination of hardware and software, across one or more other functional components. For example, the emphasizer 200 may be implemented using a plurality of microprocessors executing firmware. As another example, the fixture identifier 32 may be implemented using one or more application specific integrated circuits (i.e., "ASICs") and related software, or a combination of ASICs, discrete electronic components (e.g., transistors), and microprocessors. Accordingly, the representation of the fixture identifier 32 and other components in a single box of FIG. 3 is for simplicity purposes only. In fact, in some embodiments, the fixture identifier 32 of FIG. 3 is distributed across a plurality of different machines—not necessarily within the same housing or chassis.

Additionally, in some embodiments, components shown as separate (the fixture identifier 32 and the machine vision 31) may be replaced by a single component. Furthermore, certain components and sub-components in FIG. 3 are optional.

It should be reiterated that the representation of FIG. 3 is a significantly simplified representation of an actual assembly assistant 180. Those skilled in the art should understand that such a device may have other physical and functional components, such as central processing units, other packet processing modules, and short-term memory. Accordingly, this discussion is not intended to suggest that FIG. 3 represents all of the elements of the assembly assistant 180.

Figure 4:
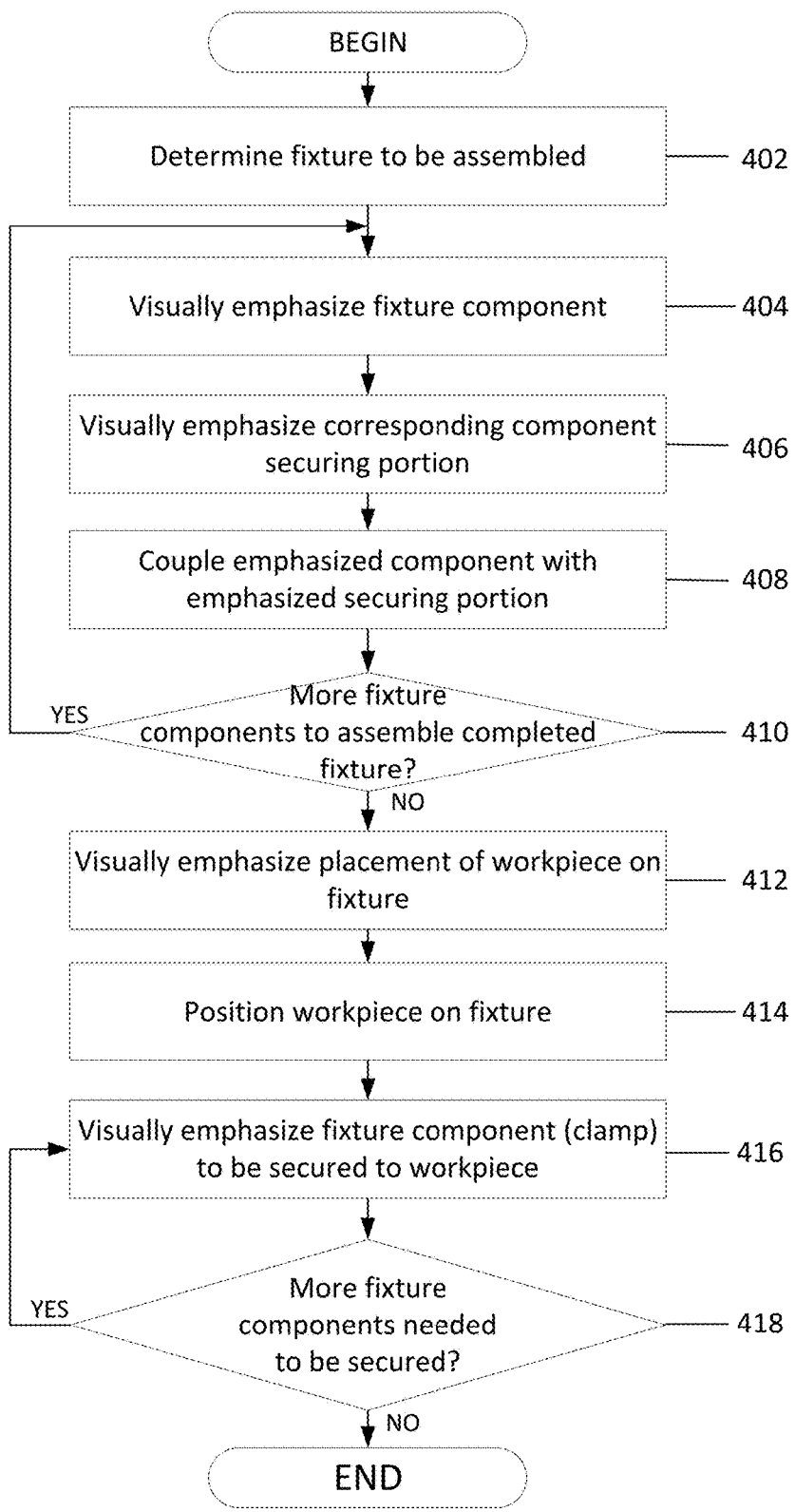
FIG. 4 shows a process of assembling a fixture in accordance with illustrative embodiments of the invention.

FIG. 4 shows a process 400 of assembling a fixture in accordance with illustrative embodiments of the invention. It should be noted that this process is substantially simplified from a longer process that normally would be used to assembly a fixture. As such, the process may have additional steps that are not discussed. In addition, some steps may be optional, performed in a different order, or in parallel. Accordingly, discussion of this process is illustrative and not intended to limit various embodiments of the invention. Finally, although this process is discussed with regard to assembling a single fixture, the process of FIG. 4 can be expanded to cover assembling a plurality of fixtures. Those skilled in the art therefore can modify the process as appropriate.

The process begins at step 402, which determines the fixture 214 to be assembled. As discussed previously, a given workpiece 212 has a corresponding fixture 214. Therefore, a workpiece 212 identifier (e.g., a model or SKU number) may be used to identify the corresponding fixture 214 (e.g., by finding the corresponding fixture 214 identifier in the database 30). Alternatively, machine vision (e.g., an optical CMM 100, augmented reality glasses, and/or a smartphone) may be used to identify the workpiece 212, and therefore to determine the corresponding fixture 214 to be assembled. When the appropriate fixture 214 is determined, instructions for assembling the fixture 214 may also be loaded.

The process then proceeds to step 404, which visually emphasizes the first fixture component 215. In general, instructions for assembling the fixture 214 provide an ordered list of steps for assembling the components 215. Thus, the process begins by visually emphasizing the first fixture component 215 to be assembled as part of the fixture 214.

Figure 5A:
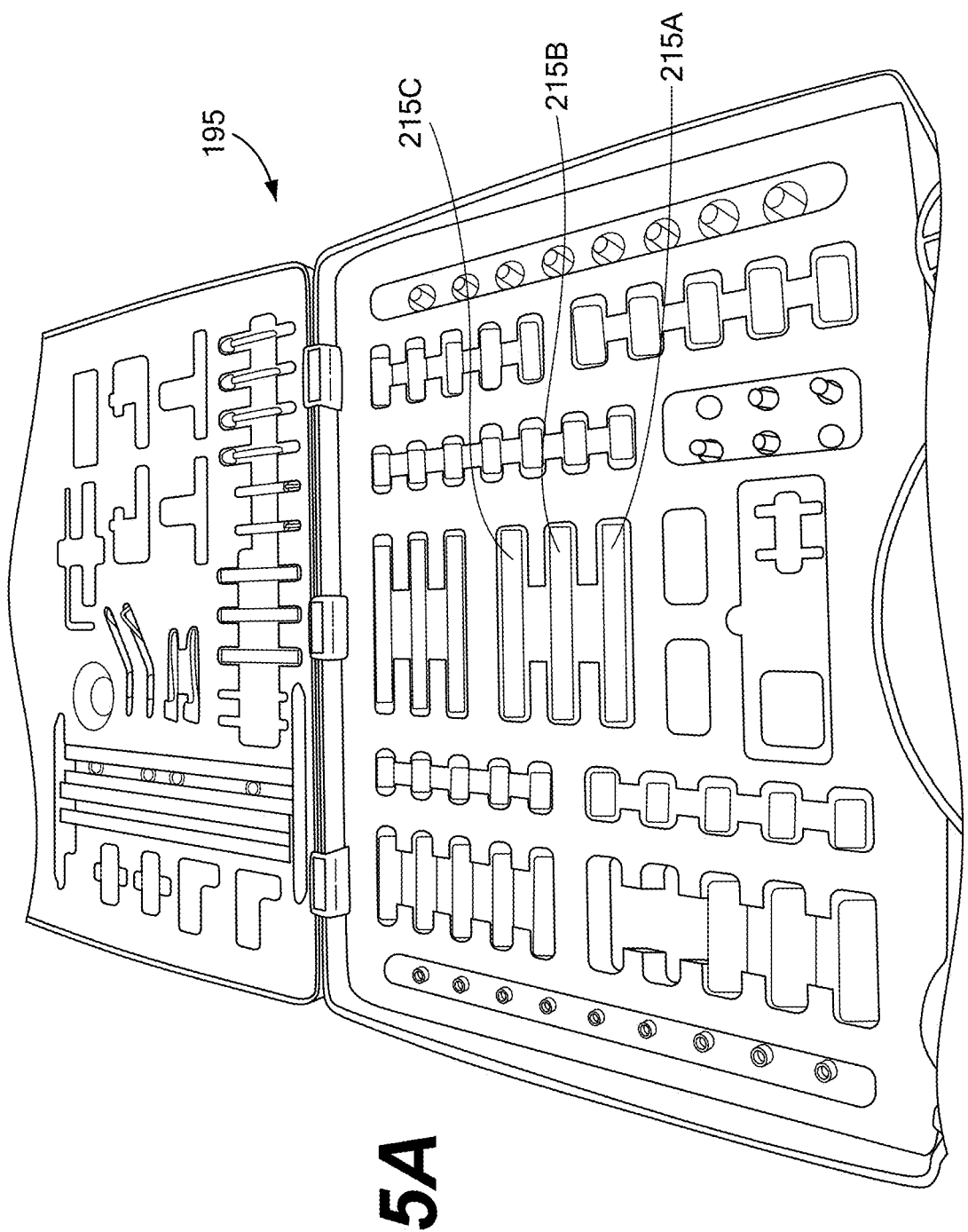
FIG. 5A schematically shows a fixture kit in accordance with illustrative embodiments of the invention.

FIG. 5A schematically shows a fixture kit 195 in accordance with illustrative embodiments of the invention. The kit 195 contains various fixture components 215 to be used to assemble the fixture 214. Three components 215A-215C are called out in FIG. 5A. Assuming for the sake of example that these components are to be used alphabetical order, then component 215A would be visually emphasized first.

Figure 5B:
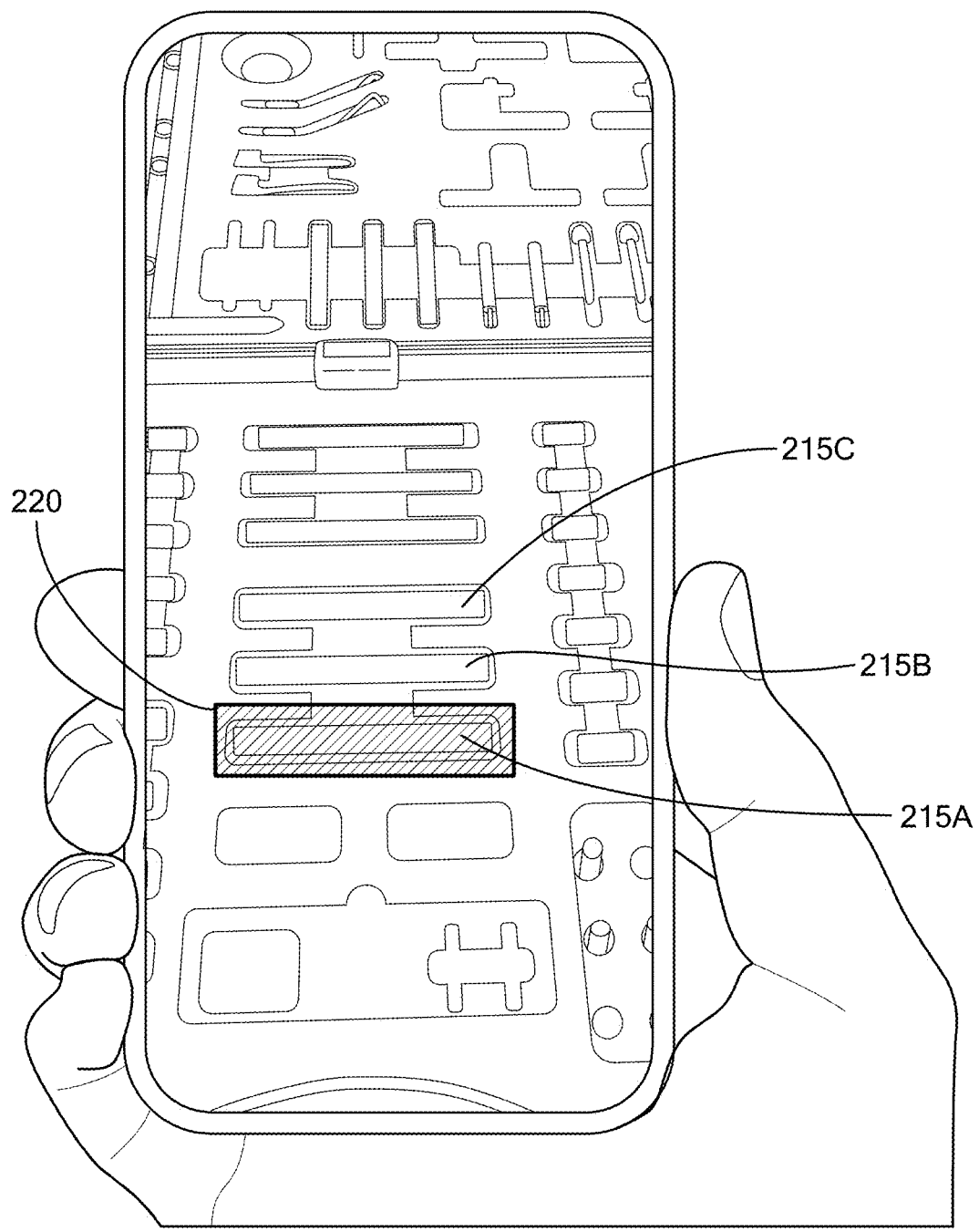
FIGS. 5B-5C schematically show alternative embodiments of a visual emphasis on the component in accordance with illustrative embodiments.
Figure 5C:
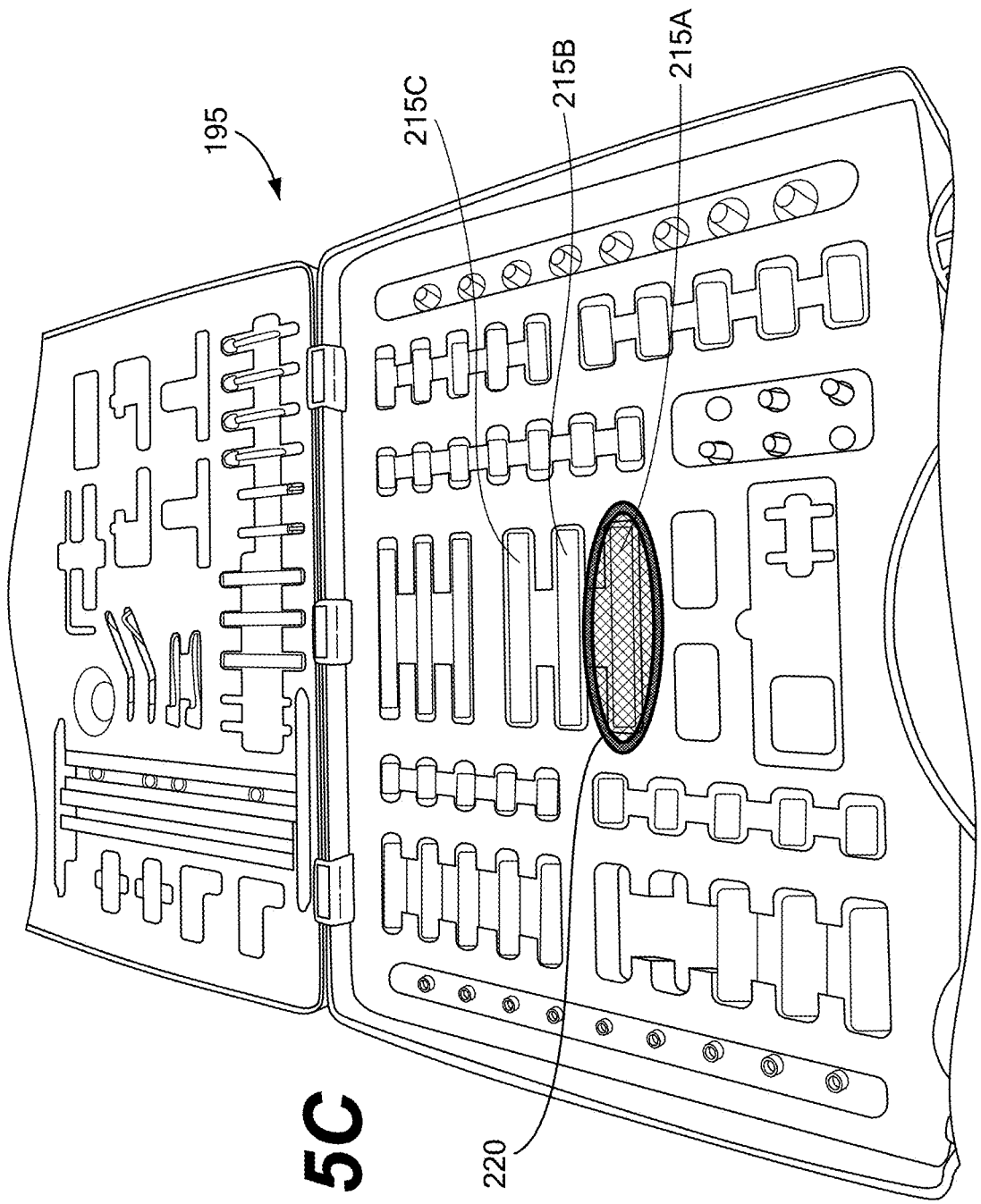

FIG. 5B schematically shows a visual emphasis 220 on the component 215A in accordance with illustrative embodiments. The visual emphasis 220 may also be referred to as a visual cue 220. The visual emphasis 220 indicates (e.g., to the technician) that component 215A is the component 215 to be assembled on the fixture plate 115. In various embodiments, the visual emphasis 220 may be shown in a display of an electronic device, as shown in FIG. 5B. Alternatively, the visual emphasis may be display in an augmented reality display. In illustrative embodiments, the augmented reality display may be formed within augmented reality eyeglasses. Alternatively, as shown in FIG. 5C, the visual emphasis 220 may be provided from a light source. In various embodiments, the visual emphasis 220 may include, among other things, a highlight, a boundary (e.g., in a display or generated by a light), a color changing filter over the component 215A, or any other visually distinguishable marking that distinguishes the component 215A from other components 215.

As mentioned previously, among other ways, visually emphasizing the first fixture component and/or the first securing portion includes displaying a light on the first fixture component and/or the first securing portion. The light may have a first color and/or form a first pattern (e.g., a first hatching pattern). The light pattern may form a number shape and/or a speckle pattern. Additionally, the visual emphasis 220 may use a different color and/or form a different pattern for visually emphasizing subsequent components and/or subsequent securing portions. Alternatively, the visual emphasis 220 may use the same color and/or the same pattern for visually emphasizing subsequent components.

Although an ordered kit 195 is shown with reference to step 404, it should be understood that, in various embodiments, the components 215 may be scattered (e.g., in a drawer 191) and do not necessarily need to be in an ordered set/kit 195. Furthermore, in some embodiments, components 215 may be identical and interchangeable, and therefore, the system may visually emphasize one or more of these components 215.

Figure 6A:
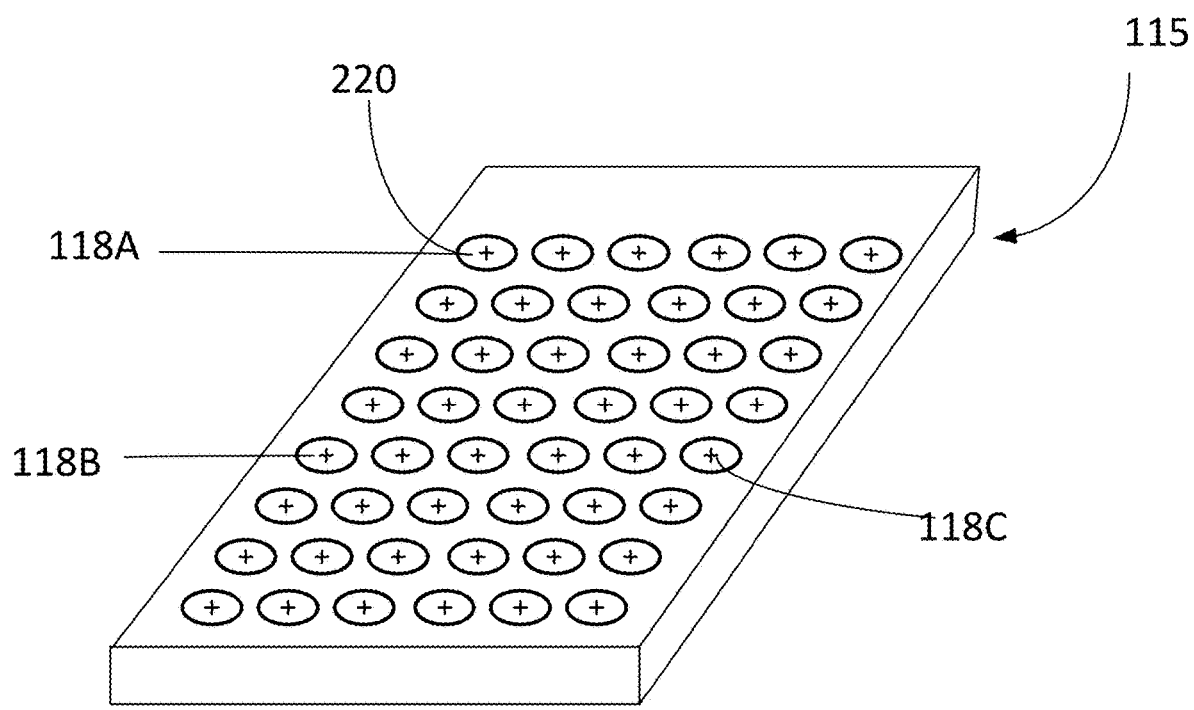
FIGS. 6A and 6C schematically show the fixture plate in accordance with illustrative embodiments.

The process then proceeds to step 406, which visually emphasizes corresponding fixture securing portions 118 in the fixture plate 115. FIGS. 6A and 6C schematically show the fixture plate 115 in accordance with illustrative embodiments. As shown, the fixture plate 115 has a number of component securing portions 118. Three component securing portions 118A-118C are called out in FIG. 6A. For the sake of the example, assume that securing portions 118A-118C correspond to components 215A-215C from FIG. 5A.

Figure 6B:
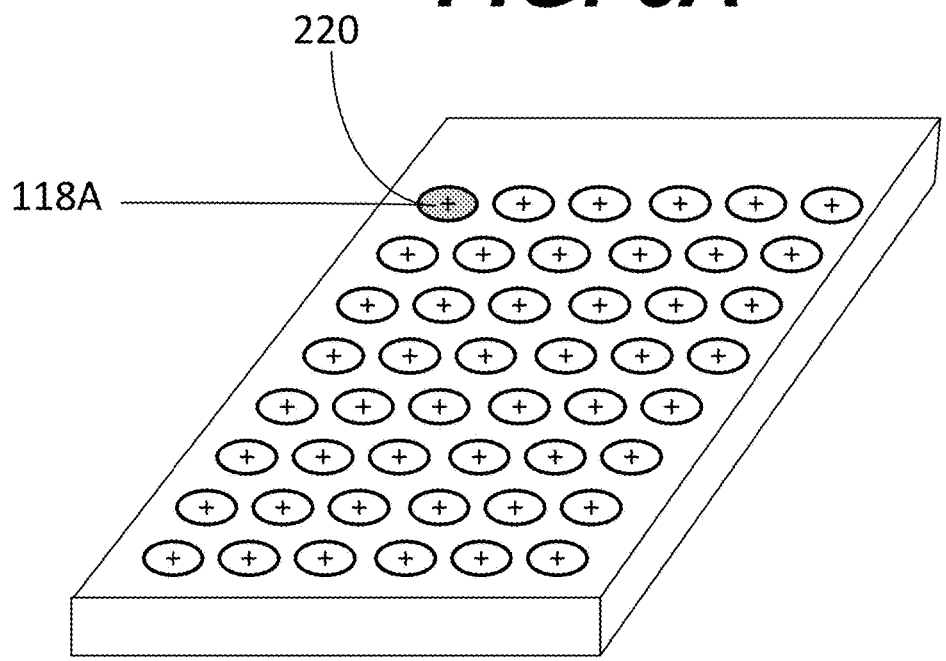
FIGS. 6B and 6D schematically show alternative embodiments of a visual emphasis on the fixture securing portion in accordance with illustrative embodiments of the invention.
Figure 6C:
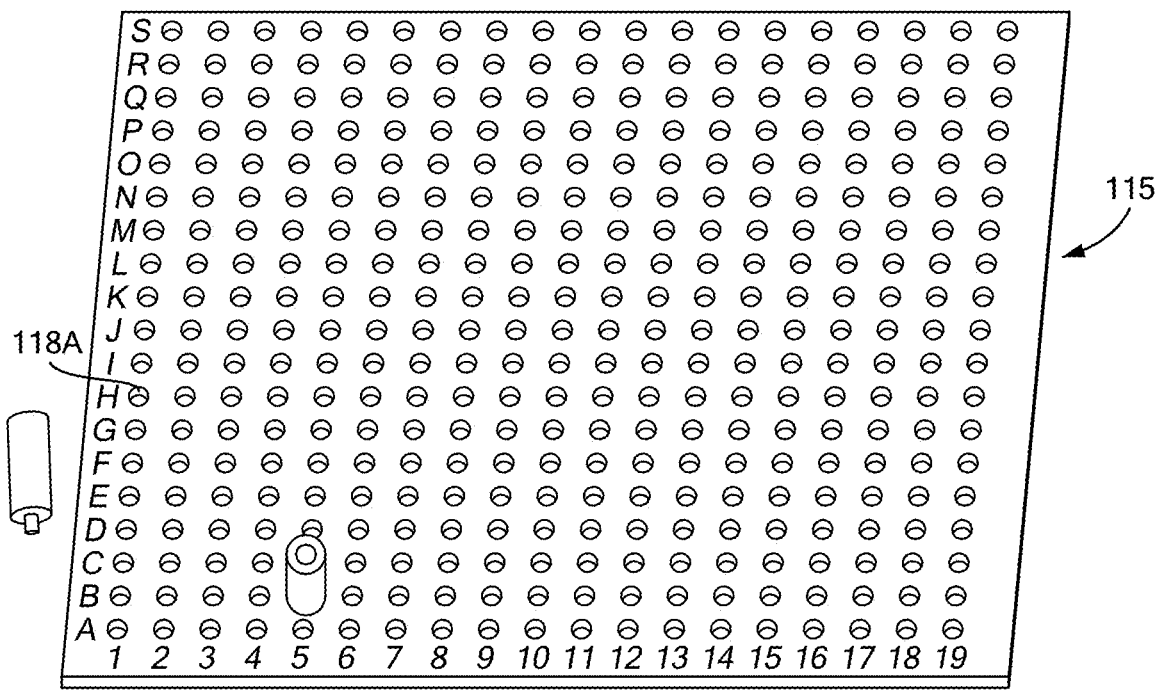
Figure 6D:
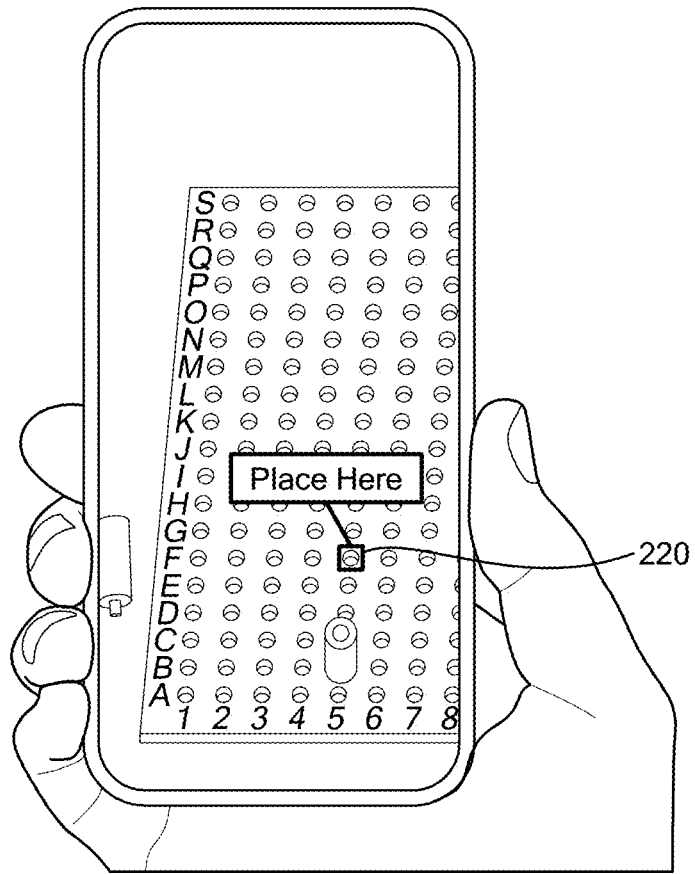

FIGS. 6B and 6D schematically show alternative embodiments of a visual emphasis 220 on the fixture securing portion 118A in accordance with illustrative embodiments of the invention. The visual emphasis 220 indicates (e.g., to the technician) that the securing portion 118A is the securing portion 118 that corresponds to the component 215A to be coupled with the plate 115. In various embodiments, the visual emphasis 220 may be provided from a light source, as shown in FIG. 6B, or may be provided within a display, as shown in FIG. 6D (e.g., augmented reality glasses or within a display of a smartphone). The visual emphasis 220 may include, among other things, a highlight, a boundary, a color changing filter over the component 215A, or any other visually distinguishable marking that distinguishes the securing portion 118A from other securing portion 118B-C. Furthermore, as shown in FIG. 6D, various embodiments may display a message to further assist with the assembly (e.g., "place here").

Additionally, some embodiments may provide a visual emphasis 220 for how the fixture component 215 is oriented relative to the securing portion 118. For example, the component 215 may have a non-symmetrical shape and/or a feature (such as a clamp) that should point in a particular direction. Various embodiments may provide an outline showing which way the component 215 is oriented.

Figure 6E:
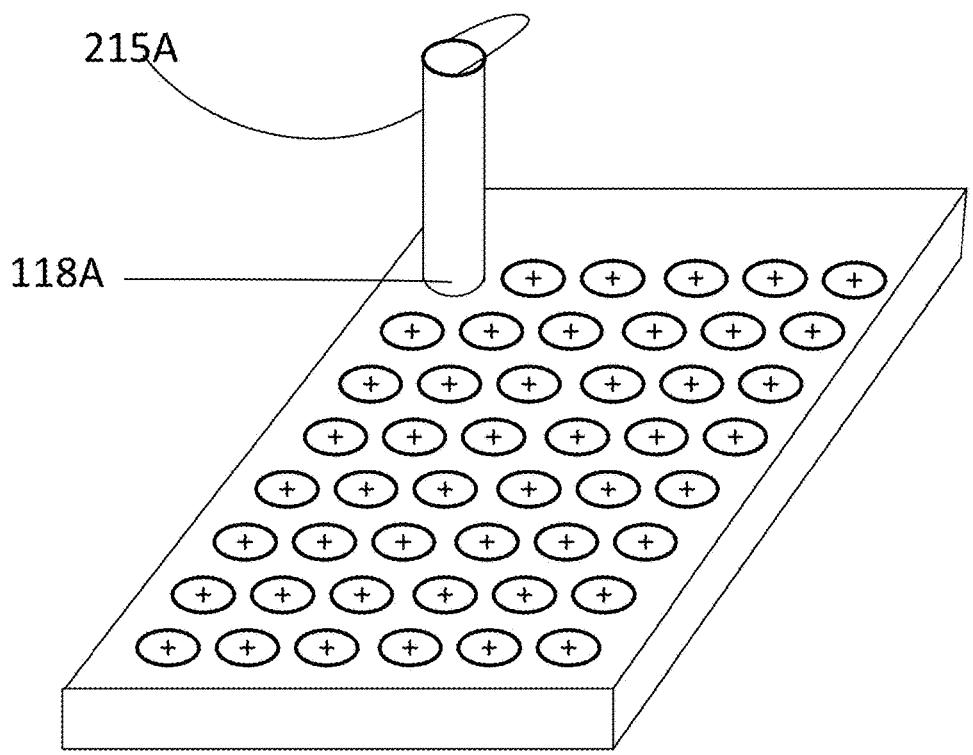
FIG. 6E schematically shows the fixture component coupled with the corresponding securing portion in accordance with illustrative embodiments of the invention.

The process then proceeds to step 408, which couples the emphasized component 215A with the emphasized securing portion 118A. To that end, a technician or robot may couple the two components using any standard methodology (e.g., by threading a male portion of the component 215 with a female thread on the securing portion 118, magnetically coupling, etc.). FIG. 6E schematically shows the fixture component 215A coupled with the corresponding securing portion 118A in accordance with illustrative embodiments of the invention.

The process then proceeds to step 410, which asks whether there are more fixture components to assemble the completed fixture. If the answer is yes, then the process returns to step 404, which visually emphasizes the next fixture component 215. As mentioned previously, the assembly instructions contain a list of fixture components 215. The next fixture component 215 is visually emphasized, and the process proceeds to step 406, which visually emphasizes the corresponding securing portion. The second component 215 is then coupled with the appropriate securing portion at step 408. Steps 404-408 are repeated for all of the components 215 of the fixture 214.

Figure 6F:
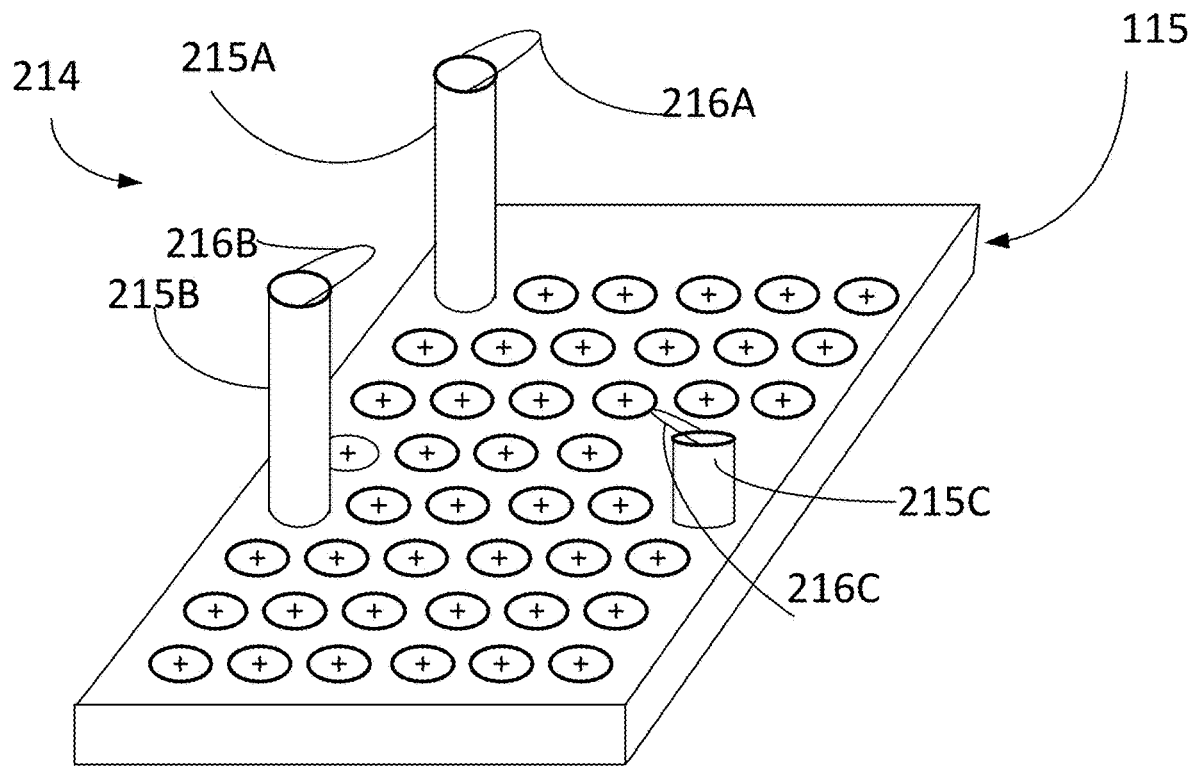
FIG. 6F schematically shows an example of an assembled fixture in accordance with illustrative embodiments of the invention.

FIG. 6F schematically shows an example of an assembled fixture 214 in accordance with illustrative embodiments of the invention. The fixture 214 is shown with three components 215A-215C, but it should be understood that various embodiments may be used to assemble fixtures 214 having more or fewer components 215. Additionally, although the fixture 214 is assembled, the clamp 216 have not yet been coupled with the workpiece 212.

Figure 7A:
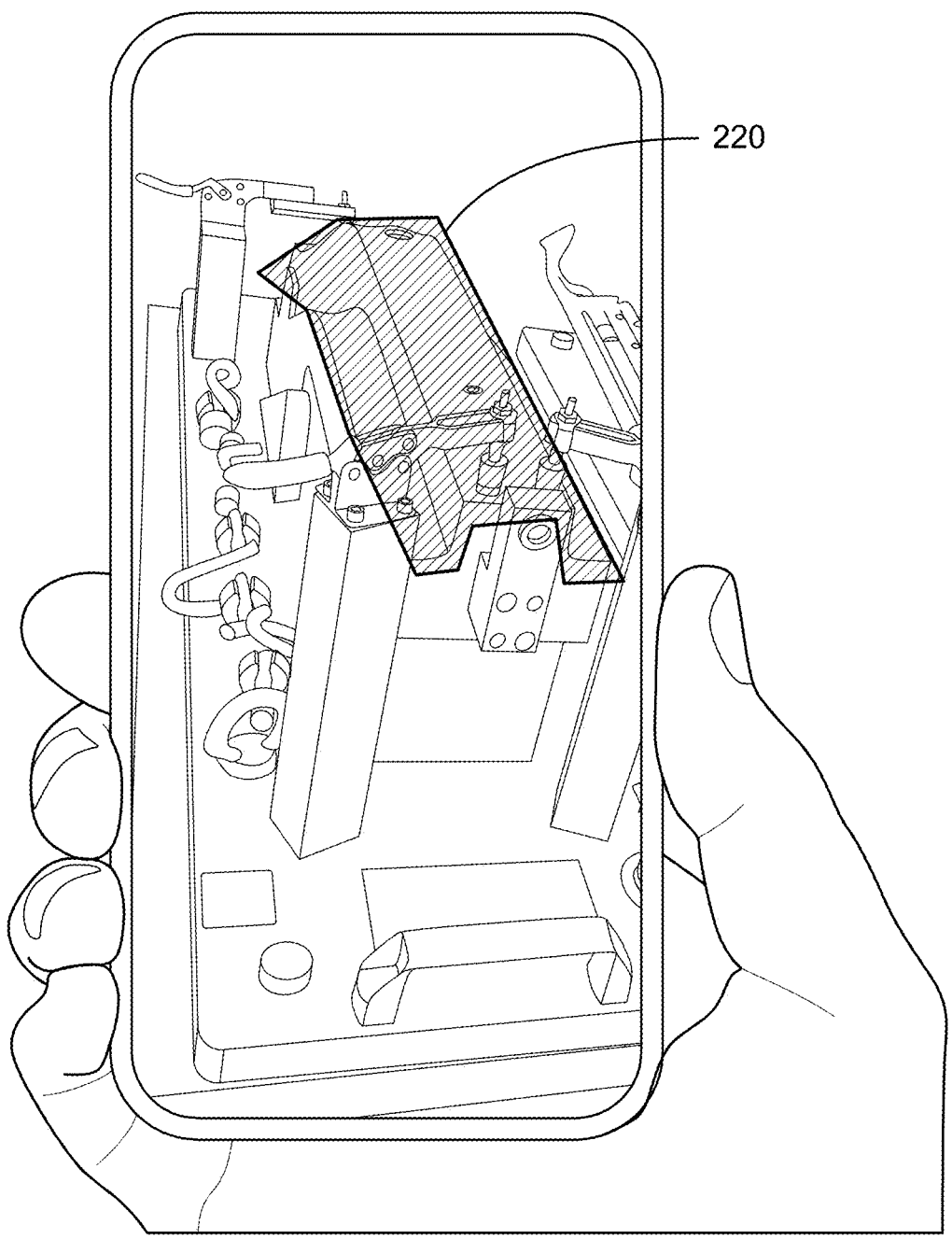
FIG. 7A schematically shows a visual emphasis of the positioning of the workpiece in accordance with illustrative embodiments.

Returning to step 410, if there are no more fixture components 215 to assemble, the process proceeds to step 412, which visually emphasizes the placement of the workpiece 212 on the fixture 214. FIG. 7A schematically shows a visual emphasis 220 of the positioning of the workpiece 212 in accordance with illustrative embodiments. The visual emphasis 220 indicates (e.g., to the technician) how the workpiece is to be positioned on the fixture 214. In various embodiments, the visual emphasis 220 may be shown in a display of an electronic device, as shown in FIG. 7A. Among other things, the visual emphasis 220 may include, among other things, a highlight, a boundary (e.g., in a display or generated by a light), a color changing filter over the where the workpiece 212 should be positioned, or any other visually distinguishable marking that provides an indication of position of the workpiece 212 relative to the fixture 214 and/or the plate 115.

Figure 7B:
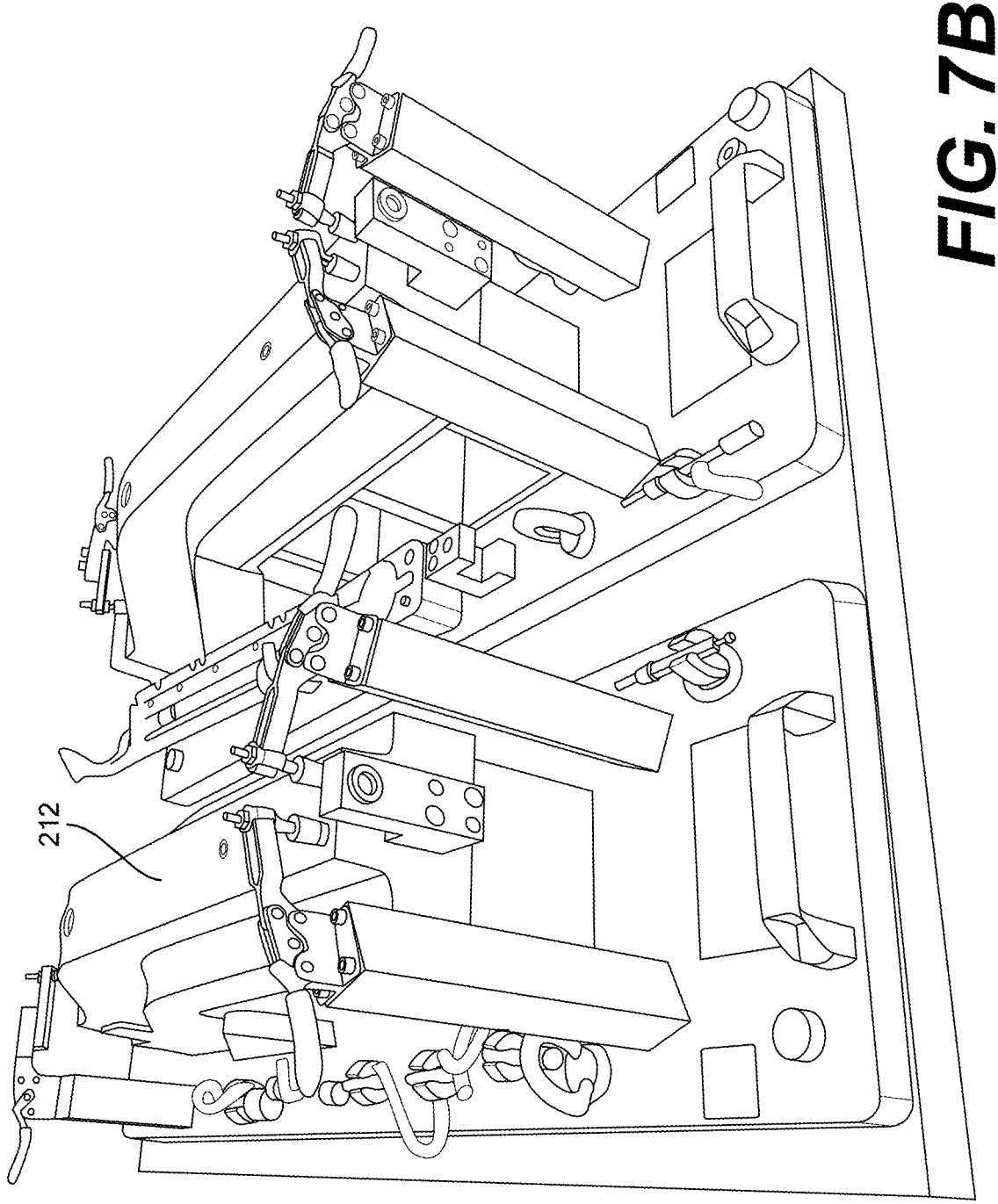
FIG. 7B schematically shows the workpiece positioned in accordance with the visual cue of FIG. 7A.
Figure 7C:
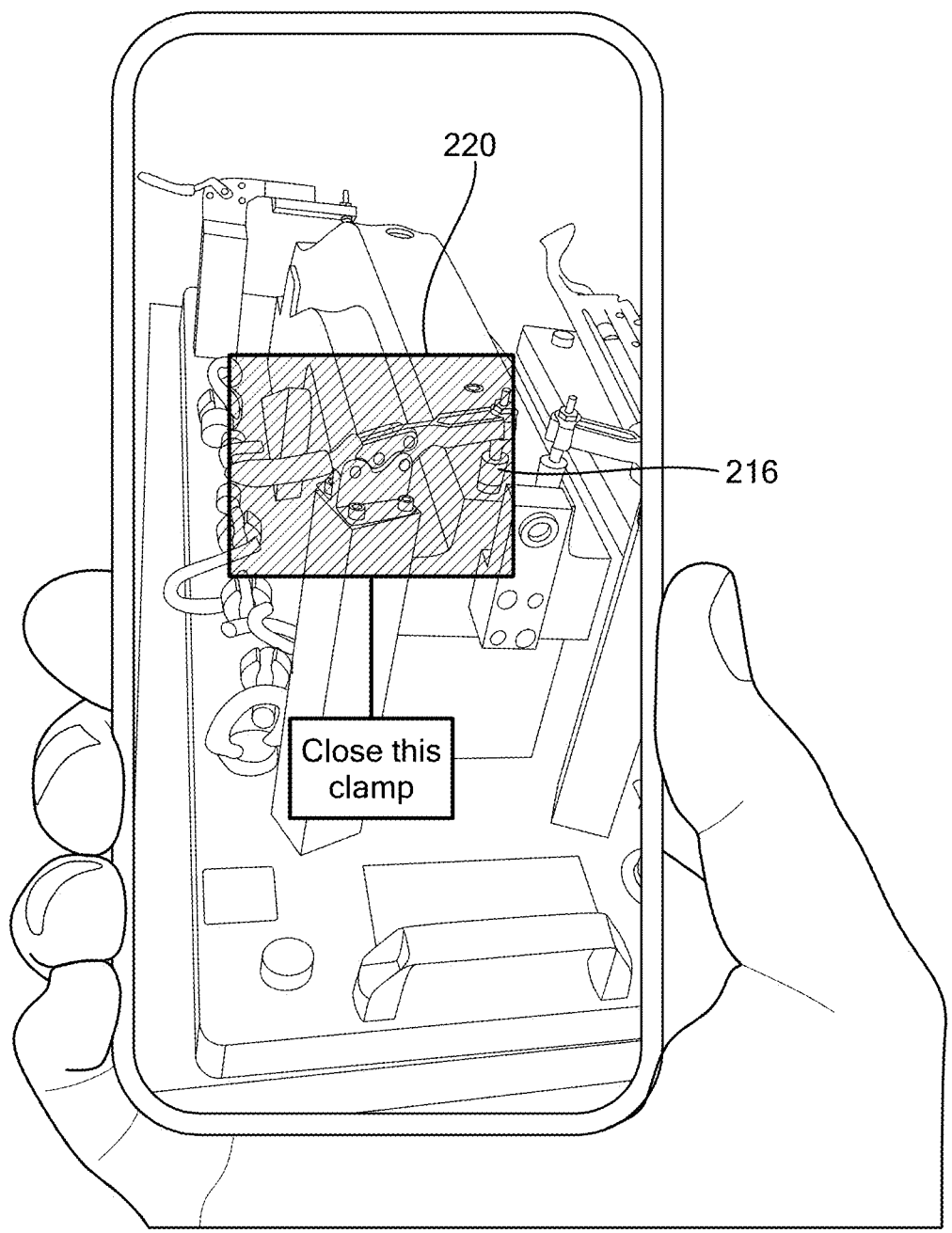
FIG. 7C schematically shows the visual cue to close a clamp in accordance with illustrative embodiments.

The process then proceeds to step 414, which positions the workpiece on the fixture 214 (e.g., in accordance with the visual emphasis provided by step 412). FIG. 7B schematically shows the workpiece 212 positioned in accordance with the visual cue of FIG. 7A. When the object 212 is positioned relative to the fixture 214, the process may proceed to step 416, which visually emphasizes fixture components 215 (e.g., the clamp 216) to be secured to the workpiece 212. FIG. 7C schematically shows the visual cue 220 to close a clamp in accordance with illustrative embodiments. The visual emphasis 220 on the component 215 may include, among other things, a highlight, a boundary (e.g., in a display or generated by a light), a color changing filter over the component, or any other visually distinguishable marking that provides an indication of the component 215 that should be secured to the workpiece 212.

Figure 6G:
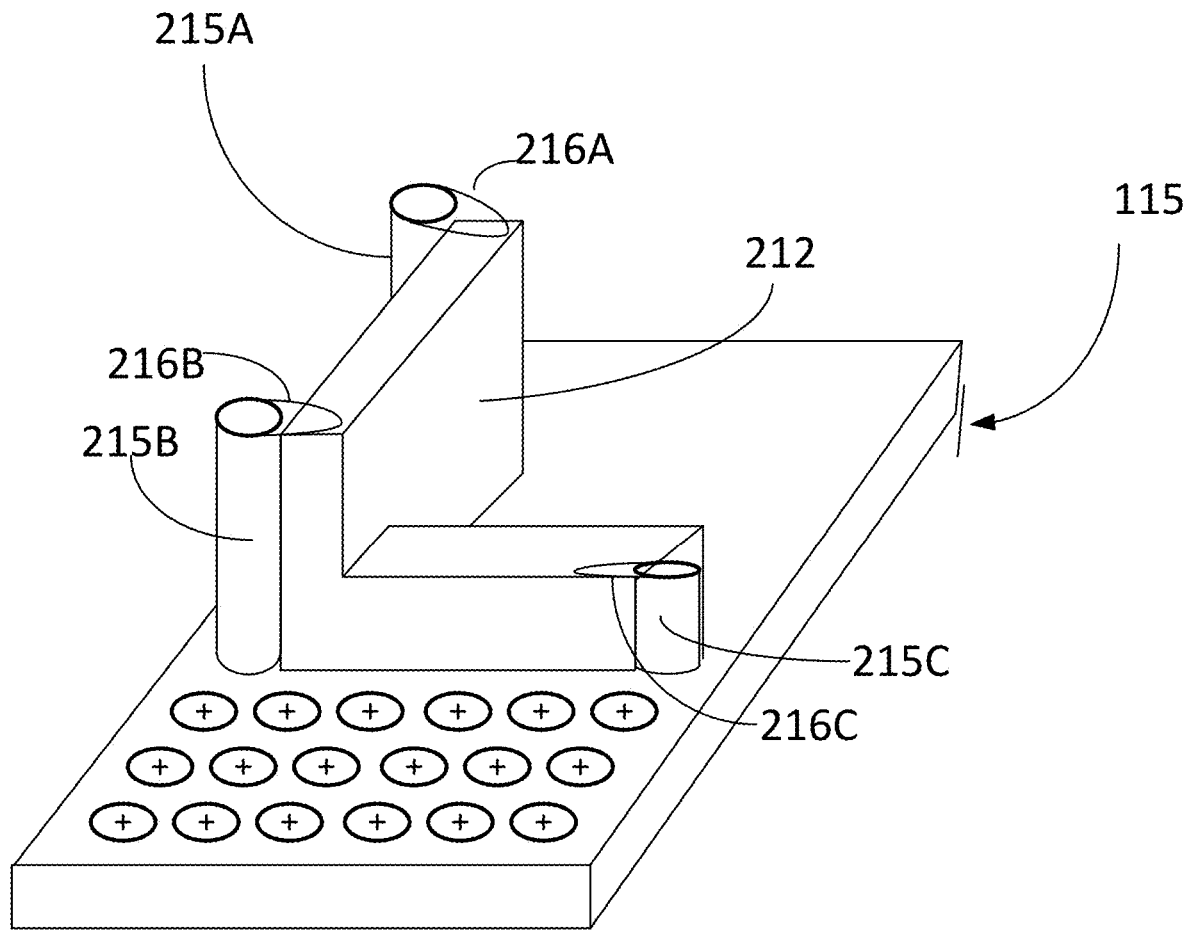
FIG. 6G schematically shows the workpiece secured to the fixture of FIG. 6F in accordance with illustrative embodiments.

For example, the emphasizer 200 may emphasize clamp 216A. The technician may clamp down clamp 216A on the workpiece 212. The process then proceeds to step 418, which asks if there are more fixture components that need to be secured to the workpiece 212. If the answer is yes, the process returns to step 416, which visually emphasizes the next fixture component to be secured to the workpiece. As discussed previously, some components may be clamped/affixed to the workpiece 212 in a certain order (e.g., to help prevent damage to the workpiece 212). Illustrative embodiments advantageously help a technician identify the appropriate order of components 215 that are to be fixed. Thus, in the present example, clamp 216B may be emphasized subsequently to 216A. The process may be repeated again until there are no more components 215 left to secure to the workpiece 212 (e.g., clamp 216C may be secured to the workpiece). FIG. 6G schematically shows the workpiece 212 secured to the fixture 214 of FIG. 6E in accordance with illustrative embodiments. When there are no more fixture components 215 to be secured to the workpiece 212, the process comes to an end.

In various embodiments, some of the steps of the process 400 of FIG. 4 may be optional, performed in a different order, or in parallel. For example, in some embodiments, the process of FIG. 4 may be used to help assembly the fixture using steps 402-410. Some other embodiments may optionally skip steps 402-410, and may merely use the process of steps 412-418. Accordingly, discussion of this process is illustrative and not intended to limit various embodiments of the invention. Indeed, the steps 412-418 may be used with other objects other than fixtures 214 and/or fixture plates 115.

Various embodiments of the invention may be implemented at least in part in any conventional computer programming language. For example, some embodiments may be implemented in a procedural programming language (e.g., "C"), as a visual programming process, or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the methods described above) may be implemented as a computer program product for use with a computer system. Such implementation may include a series of computer instructions fixed either on a tangible, non-transitory, non-transient medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method for assembling a fixture to hold a workpiece for measurement by a CMM, the method comprising:
   providing a plurality of fixture components that are used to assemble a fixture for holding a workpiece;
   providing a fixture plate having a plurality of fixture component securing portions configured to couple with the fixture components to hold the fixture components in a predefined position;
   receiving information relating to the workpiece to be measured and/or the fixture to be assembled to hold the given workpiece;
   determining the fixture components that are used to assemble the fixture as a function of receiving information;
   determining the securing portions that correspond to each of the fixture components that are used to assemble the fixture;
   identifying a first fixture component from the fixture components that are used to assemble the fixture;
   visually emphasizing the first fixture component;
   identifying a first securing portion that corresponds to the first fixture component; and
   visually emphasizing the first securing portion.

2. The method as defined by claim 1, further comprising coupling the first fixture component with the first securing portion to hold the first fixture component in a predefined position relative to the fixture plate.

3. The method as defined by claim 1, further comprising identifying each fixture component associated with the fixture, visually emphasizing each fixture component associated with the fixture, and/or visually emphasizing each corresponding securing portion associated with the fixture.

4. The method as defined by claim 3, wherein a plurality of fixture components are visually emphasized simultaneously.

5. The method as defined by claim 1, wherein visually emphasizing the first fixture component and/or the first securing portion includes displaying a light on the first fixture component and/or the first securing portion.

6. The method as defined by claim 5, wherein the light has a first color.

7. The method as defined by claim 5, wherein the light forms a first pattern.

8. The method as defined by claim 5, further comprising:
   identifying a second fixture component;
   visually emphasizing the second fixture component;
   identifying a second securing portion that corresponds to the second fixture component; and
   visually emphasizing the second securing portion,
   wherein visually emphasizing the second fixture component and/or the second securing portion includes displaying a light on the second fixture component and/or the second securing portion.

9. The method as defined by claim 8, wherein the light has a second color.

10. The method as defined by claim 8, wherein the light forms a second pattern.

11. The method as defined by claim 1, wherein the fixture component securing portions are threaded holes and and/or magnetic holes.

12. The method as defined by claim 1, wherein the first fixture component is visually emphasized in an augmented reality visualization system.

13. The method as defined by claim 1, wherein the augmented reality visualization system includes eye-glasses.

14. The method as defined by claim 1, further comprising:
   assembling the fixture components until the fixture is fully assembled; and
   coupling the workpiece to the assembled fixture.

15. A system for assembling a fixture to hold a workpiece for measurement by a CMM, the system comprising:
   a plurality of fixture components that are used to assemble a fixture for holding a workpiece to be measured;
   a fixture plate having a plurality of fixture component securing portions configured to couple with the fixture components to define the fixture, the fixture configured to couple with the workpiece to hold the workpiece in a predefined orientation;

a fixture identifier configured to identify the fixture components for holding the workpiece;

a securing portion identifier configured to identify the securing portions that couple with the fixture components for holding the workpiece; and a visual emphasizing unit configured to visually emphasize one or more of the fixture components and/or one or more of the securing portions to provide an indication of a fixture component that is to be coupled with a corresponding securing portion.

16. The system as defined by claim 15, wherein the visual emphasizing unit includes a light source.

17. The system as defined by claim 15, wherein the fixture identifier includes a camera.

18. The system as defined by claim 15, further comprising a workpiece to be measured.

19. The system as defined by claim 18, further comprising a workpiece identifier configured to identify the workpiece, and to provide instructions regarding fixture components and/or securing portions configured to hold the workpiece for measurement.

20. The system as defined by claim 15, further comprising a CMM configured to have the fixture plate within a measuring space of the CMM.

21. The system as defined by claim 15, further comprising augmented reality visualization system, the visual emphasizing unit configured to visually emphasize the fixture component and/or the securing portion in a display of the augmented reality visualization system.

22. A computer program product for use on a computer system for assembling a fixture to hold a workpiece for measurement by a CMM, the computer program product comprising a tangible, non-transient computer usable medium having computer readable program code thereon, the computer readable program code comprising:

program code for receiving information relating to a workpiece to be measured and/or a fixture to be assembled to hold the workpiece;

program code for determining, as a function of the received information, a plurality of fixture components that are used to assemble a fixture for holding a workpiece to be measured;

program code for determining, as a function of the received information, a plurality of fixture component securing portions configured to couple with the fixture components to hold the fixture components in a predefined position;

program code for associating each of the plurality of fixture components with a corresponding securing portion;

program code for visually emphasizing at least one of the fixture components; and program code for visually emphasizing at least one corresponding securing portions.

23. The computer program product as defined by claim 22, further comprising program code for emphasizing a single fixture component at a time.

24. The computer program product as defined by claim 22, further comprising program code for emphasizing a plurality of fixture components at a time.

25. The computer program product as defined by claim 22, wherein the program code for visually emphasizing at least one of the fixture components controls a light source to display a light on the at least one fixture component.

26. The computer program product as defined by claim 22, further comprising program code for visually emphasizing a second fixture component after a first fixture component is coupled with a first securing portion.

* * * * *